United States Patent [19]
Alfille et al.

[11] Patent Number: 5,694,209
[45] Date of Patent: Dec. 2, 1997

[54] LASER BEAM ANALYZER

[75] Inventors: Jean-Pascal Alfille, Clamart; Jean Raoux, Les Clayes Sous Bois, both of France

[73] Assignee: Commissariat a l'Energie Atomique, Paris, France

[21] Appl. No.: 531,605

[22] Filed: Sep. 21, 1995

[30] Foreign Application Priority Data

Oct. 12, 1994 [FR] France ................... 94 12164

[51] Int. Cl.⁶ .................................................. G01J 1/42
[52] U.S. Cl. ................ 356/121; 356/218; 250/227.31
[58] Field of Search ............................. 356/121–123, 356/218, 225, 431, 384–387; 250/206.1, 236

[56] References Cited

U.S. PATENT DOCUMENTS

| | | | |
|---|---|---|---|
| 2,812,685 | 11/1957 | Vossberg | 356/387 |
| 3,731,106 | 5/1973 | Mansell. | |
| 4,035,088 | 7/1977 | Jenkins et al. | 356/218 |
| 4,260,255 | 4/1981 | Wachs et al. | |
| 5,453,828 | 9/1995 | Holt | 356/121 |
| 5,463,215 | 10/1995 | Alfille. | |

FOREIGN PATENT DOCUMENTS

| | | |
|---|---|---|
| 0 461 730 | 12/1991 | European Pat. Off.. |
| 2 603 710 | 3/1988 | France. |
| 301 560 | 3/1993 | Germany. |

OTHER PUBLICATIONS

Patent Abstracts of Japan, vol. 12, No. 240 (P–727) [3087], Jul. 8, 1988, JP–A–63 033 637, Feb. 13, 1988.

*Primary Examiner*—Hoa Q. Pham
*Attorney, Agent, or Firm*—Oblon, Spivak, McClelland, Maier & Neustadt, P.C.

[57] ABSTRACT

A device for sampling a section of a laser beam using an elongated reflective element that is moved in a main direction that corresponds to the direction of elongation of the element and in a direction perpendicular to the main direction. This sampling device forms a part of a laser beam analyzer and provides a small reflected beam segment to the analyzer that corresponding to the part of the laser beam that impinges upon the moving elongated reflecting element.

16 Claims, 6 Drawing Sheets

LASER BEAM ANALYZER

BACKGROUND OF THE INVENTION

1. Field of the Invention

The present invention concerns the field of laser beam and in particular power laser beam analysis.

2. Description of the Related Art

Over the last few years, there has been a considerable increase in the emitted power performance characteristics of industrial lasers. Thus, $CO_2$ lasers have undergone a doubling of their power in 10 years (at present approximately 10 kW), the power of YAG lasers has increased from 0.3 to 3 kW over the same time period, whereas the power of excimer lasers has passed from 0.1 to 1 kW.

The applications of said lasers mainly relate to the treatment and cutting of materials. For these different operations, it is vital to ensure the reproducibility of the process, which requires knowledge of the characteristics of the emitted beam, no matter whether this is directly on leaving the laser cavity or in the laser beam focussing area.

A laser beam is characterized by a beam analyzer, which must satisfy the following conditions:

- the analyzer must be able to give the power distribution in the section of the analyzed beam, no matter whether or not the beam is focussed,
- it must have a good resistance to high power densities (with a focussed power power densities of approximately $10^6$ W/$cm_2$ are reached),
- the device must be easily installable in series in an optical transmission line of a power laser beam, without disturbing the propagation of the beam, i.e. the power losses must be below 1% and there must be little beam distortion after passing into the analyzer),
- it must be able to analyze a section of the beam in less than 1 second.

In order to satisfy these criteria, the beam cannot be analyzed by completely intercepting it. Thus, the transported power levels are high. Therefore in most existing analyzers, only a fraction of the beam is sampled for analysis.

Power laser beam analyzers are known, which are designed according to one or other of the two following principles.

According to a first principle illustrated in FIG. 1, using a plate 2 inclined by 45° in the beam 4 sampling takes place of a small fraction (approximately 1%) of the complete beam to be analyzed. This beam fraction 6 then enters a laser beam analyzer 8. This principle suffers from two disadvantages:

- it is necessary to introduce a sampling plate into the power laser beam and this leads to problems of said plate withstanding the power level and also the ageing thereof,
- it is difficult to analyze a focussed beam on leaving a focussing head.

According to a second principle illustrated in FIGS. 2a and 2b, direct sampling takes place in the power beam 10, 12 of a fraction of the latter and said fraction is analyzed. It is a mobile element 14, 16 of the analyzer which cuts the focussed (FIG. 2b) or non-focussed (FIG. 2a) laser beam and returns the sampled beam fraction to one or more detectors.

The advantage of this sampling principle is an easy installation of the analyzer from the exit of the laser source beam to the end of the optical line in the beam focussing area (there is no sampling plate interposing). However, the mobile element must be able to withstand high power densities up to $10^6$ to $10^7$ W/$cm^2$.

An example of a power laser beam analyzer is illustrated in FIGS. 3 and 4, respectively for an unfocussed beam and a focussed beam. In FIG. 3 the reference 18 designates a high power, unfocussed, laser beam, reference 20 a rotary support with a needle for measuring unfocussed beams, said support being installed on a forward movement carriage 22, controlled by a driving device 24 controlled by an electronic control 26. In FIG. 4 reference 28 designates a focussing optics and reference 30 a rotary support with a needle for measuring focussed beams. References 22, 24 and 26 designate the same elements as in FIG. 3. In both cases the needle has a longitudinal cavity and a hole coaxial to the laser beam, made on the side of the needle facing the beam and communicating with the cavity. The radiation of the beam enters by the hole and is guided in the needle to a detector located on the axis of the rotary support. The movement of the needle is controlled by the advance movement of the carriage 22. The signals from the detector are then digitized and temporarily stored in a processor, followed by transfer to a microcomputer for subsequent processing. Finally, the diameter of the lateral hole in the needle can be modified as a function of the incident laser beam power. Although such a device is suitable for moderately focussed beams, it is not suitable for highly focussed beams.

Another prior art device known as the LBA (Laser Beam Analzyer) is illustrated in FIG. 5. A rotary needle 32 mounted on a support 34 reflects, e.g. in two perpendicular directions, a laser beam on two detectors 36, 38. In FIG. 5 reference 40 designates the section of the laser beam. This type of device does not make it possible to analyze moderately focussed beams (focal spot diameter above 1 mm) and even less highly focussed beams (focal spot diameter below 1 mm). A similar device is described in DD-A-301 560.

Consequently the major problem of the above-described devices is that of the analysis of highly focussed beams for which power densities are very high (above $10^6$ W/$cm^2$) on the sampling element. In certain cases of the analysis of highly focussed beams with high power levels (above 5 kW), there has even been a deterioration or destruction of the sampling element.

SUMMARY OF THE INVENTION

The present invention aims at solving these problems. More specifically, it relates to a laser beam sampling device, in which scanning takes place of a section of the beam using a sampling element and having an elongated shape, in a main direction and having means for moving the sampling element, characterized in that said means permit a movement of the sampling element having a velocity component in a first direction, perpendicular to the main direction, and a velocity component in said main direction.

Thus, when the analyzed beam is focussed or highly focussed, it is possible to increase the surface of the element irradiated by said beam. In a conventional analyzer, the sampling element is subject to an energy density $D_e$ during its passage in the focussed beam and given by the formula: $D_e = P/S \cdot \tau$ in which P represents the power in the focussed beam, S the surface of the sampling element irradiated by the focussed beam (S=diameter of the sampling element x diameter of the beam) and $\tau$ the passage time of the needle in the beam. Through being able to combine a movement in the main direction of the elongated element with a standard scanning movement of said element, it is possible to increase the surface S exposed to the laser beam.

According to an embodiment, the sampling element is placed in translation in the two directions. The use of two translation movements makes it possible to simplify the acquisition of signals and in particular their processing.

Moreover, it is possible to interpose such a sampling element in an optical transmission line of a power laser without any modification to said line and without disturbing the beam after the passage thereof at the sampling element. It is also easily possible to analyze unfocussed beams, focussed beams and highly focussed beams.

According to another embodiment, the sampling element is a wire.

This wire can rest on the grooves of two pulleys performing an eccentric rotary movement about two parallel spindles, means being provided for driving said pulleys in their rotary movement about said spindles.

The invention also relates to a laser beam analyzer having a sampling device like that described hereinbefore and an analysis system for the beam reflected by the sampling device.

According to an embodiment, the reflected beam analysis system comprises a slit diaphragm and means for displacing the diaphragm in accordance with a translatory movement in a direction essentially perpendicular to the direction in which the sampling element reflects the light of the laser beam. These displacement means can be formed by a stepping motor. In addition, they can also incorporate a lens for focussing the stopped down beam, which can be integral with the diaphragm in translation.

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS

Figure 1:
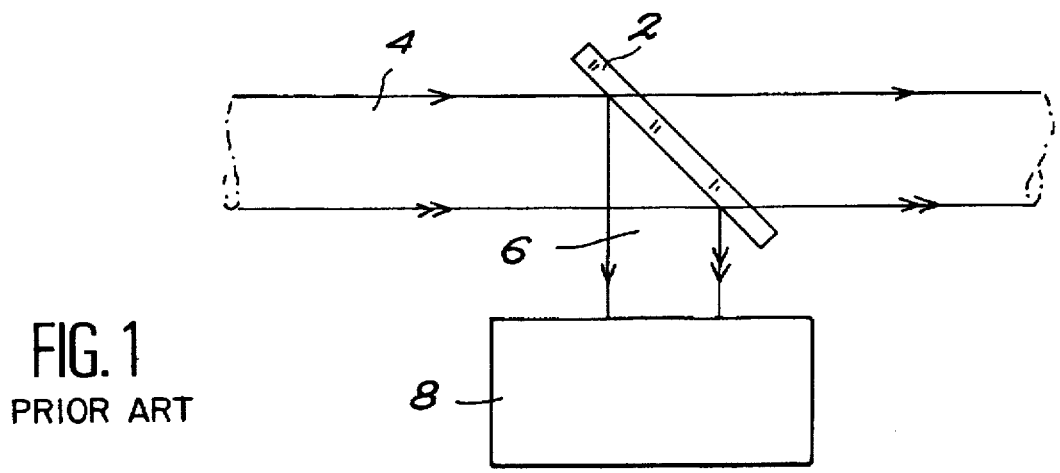
FIG. 1 The operating principle of a prior art device.
Figure 2:
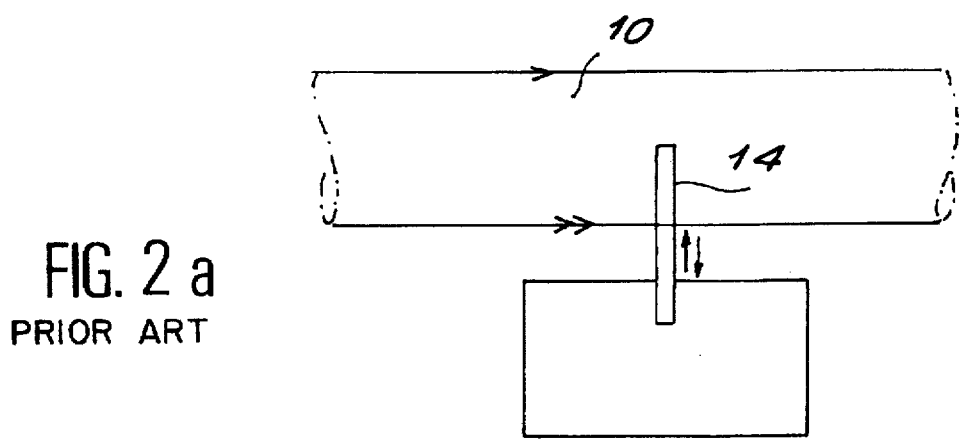
FIGS. 2a & 2b Another operating principle of prior art devices.
Figure 2:
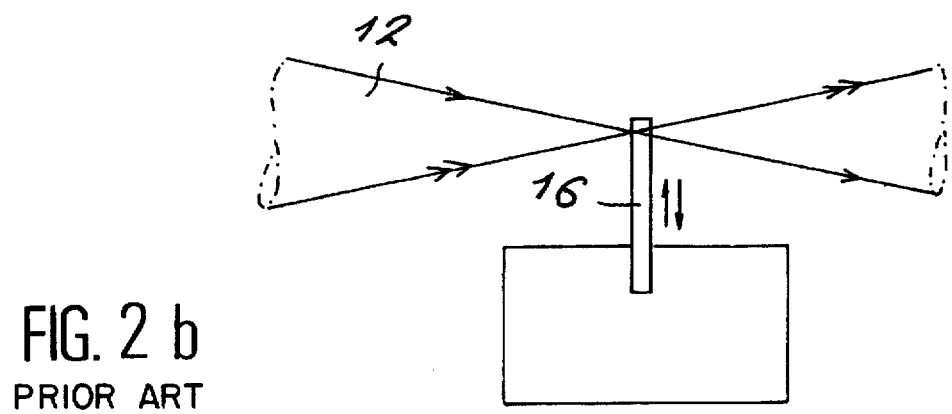
Figure 3:
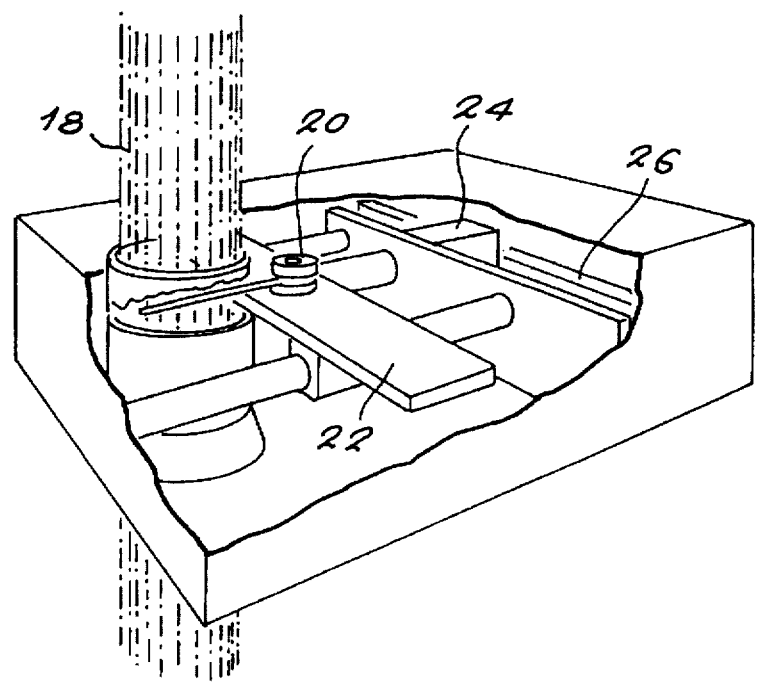
FIGS. 3 & 4 An apparatus according to the prior art.
Figure 4:
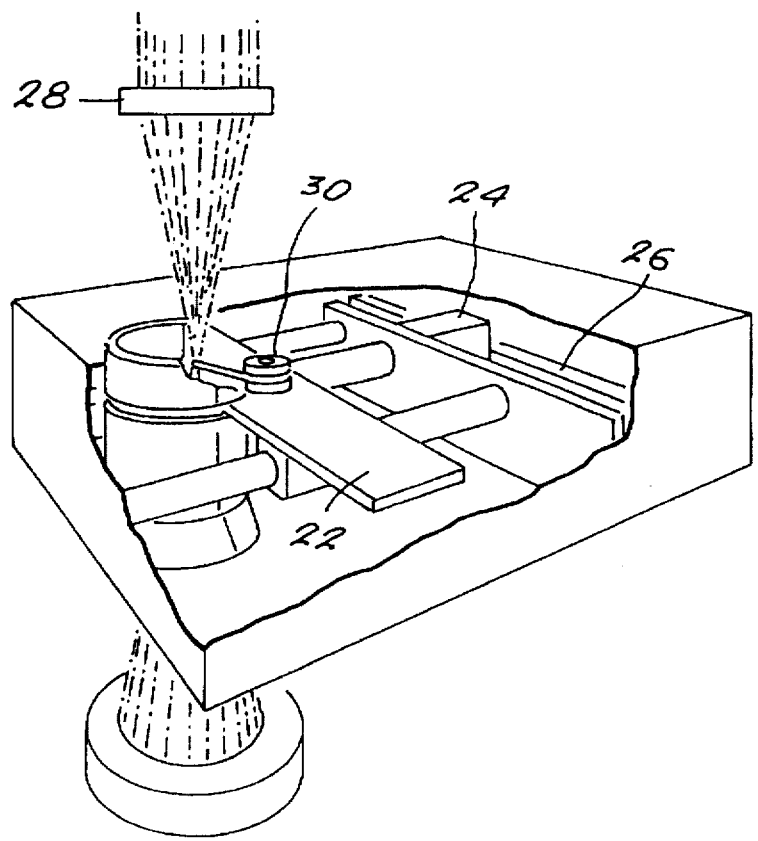
Figure 5:
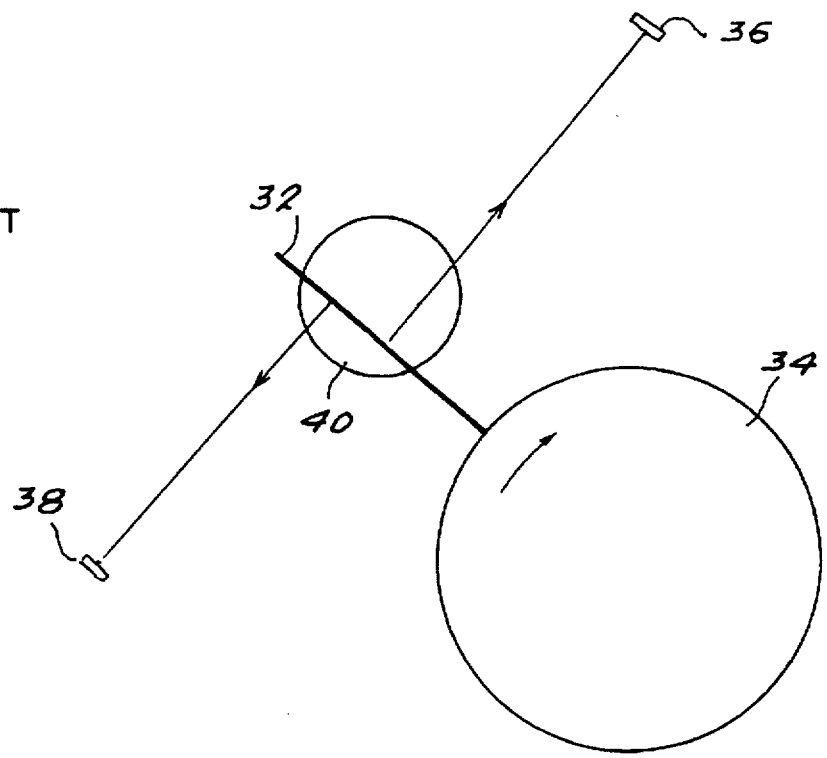
FIG. 5 Another apparatus according to the prior art.
Figure 6A:
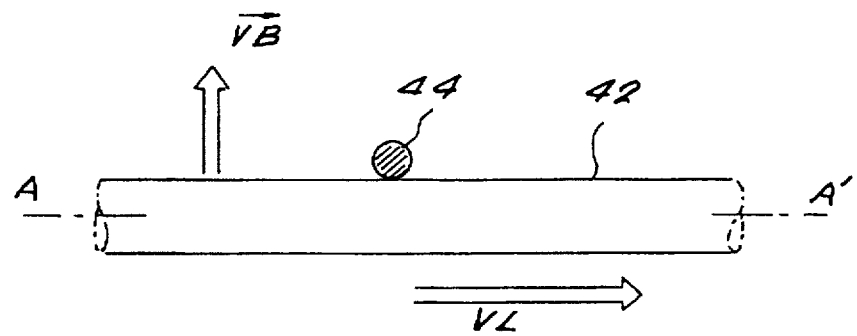
FIGS. 6a & 6b The operating principle of an apparatus according to the invention.
Figure 6B:
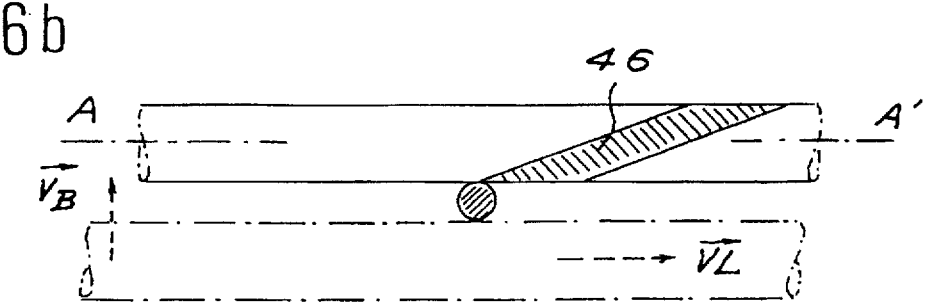

The principle on the basis of which functions the device according to the invention is illustrated in FIGS. 6a and 6b. A sampling element 42 has an elongated shape in a main direction AA'. Means, not shown in FIGS. 6a and 6b, make it possible to move said element 42 in such a way that, during the movement, it has a velocity component $V_b$ in a direction perpendicular to the direction AA' and a velocity component $V_1$ in the direction AA'. In FIGS. 6a and 6b, the reference 44 designates a section of a focussed laser beam. FIG. 6a shows the relative position of the laser beam and the sampling element following the passage of the latter into the focal spot of the laser. FIG. 6b shows their relative position after the passage of the sampling element into the focal spot. The hatched surface 46 designates the surface of the element 42 irradiated by the laser beam during its passage in front of the focal spot.

Once again using the notations given in the introduction to the present application, we obtain:

$$D_e = \frac{P}{S(1+k)} \tau$$

in which k represents the ratio of the velocities $V_1/V_b$. It can be seen that k is very high compared with 1 (e.g. $V_1 \approx 5V_b$) said relation becoming:

$$D_e \cong \frac{P}{S \cdot k} \tau$$

Thus, there is a decrease in the energy deposited on the sampling element on increasing the surface of said element scanned by the focussed beam. The sampling element can be formed by a metal wire.

Figure 7:
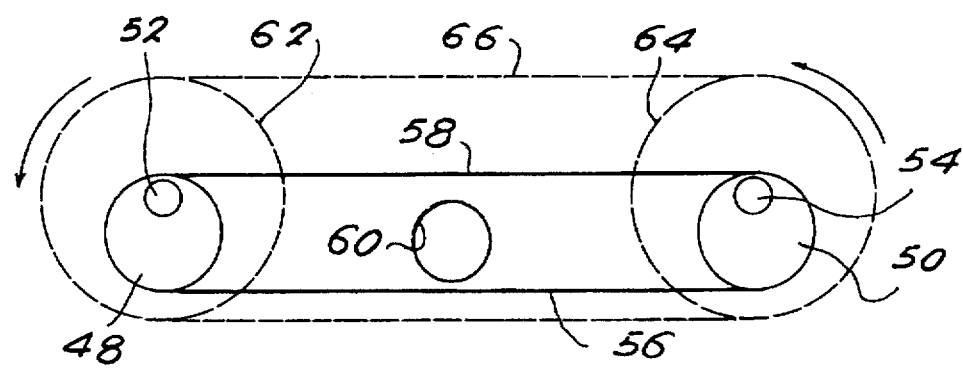
FIGS. 7a to 7c A device for performing the invention.
Figure 7:
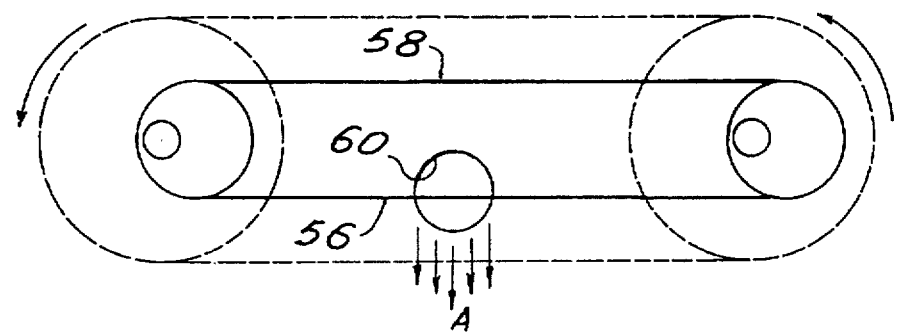
Figure 7:
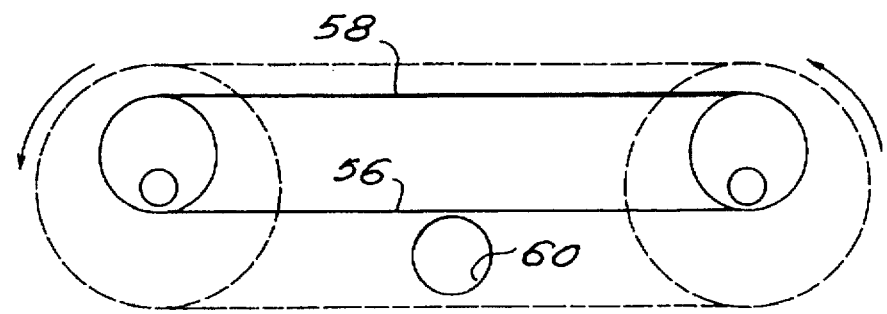

In the latter case, the device for driving the wire can be that illustrated in FIGS. 7a to 7c. More specifically, it is an assembly of two pulleys 48, 50 off-centred in rotation about two spindles 52, 54. The wire e.g. rests on a groove on the periphery of each of the pulleys 48, 50. Thus, two strands or sides are formed, namely a lower strand 56 and an upper strand 58, the reference 60 designating a section of a focussed laser beam. In FIG. 7a, in the "bottom" position of the device, the lowe strand 56 passes beneath the laser beam, whereas the upper strand 58 passes above said beam. Means are provided for rotating the two pulleys 48, 50 about their off-centred spindles 52, 54. As a result of this rotation, the two wire strands are driven in a movement formed by a translation parallel to the direction of the wire and a translation perpendicular to the direction of the wire. FIG. 7b illustrates the relative position of the two wire strands and the section 60 of the focussed laser beam, when the two pulleys 48, 50 have performed a quarter turn. The lower strand 56 of the wire traverses the beam 60 reflecting a fraction of said beam in a direction A in FIG. 7b. An analyzer, not shown in the drawings, makes it possible to collect the reflected beam and analyze it. As the wire has been longitudinally displaced during the direction of the pulleys, the energy density of the laser beam is distributed over a greater length of the wire than in the case where the latter had undergone no bottom to top translation movement. After the pulleys have performed a half-turn, the relative position of the wire strands and the laser beam is as illustrated in FIG. 7c. In this case, the lower wire strand has passed out of the beam 60 and has arrived at the end of its upward translation movement, whilst continuing a translation movement from right to left.

A means for rotating the pulleys 48, 50 is shown in dotted line form in FIGS. 7a to 7c. It is constituted by two driving pulleys 62, 64 rotating about two spindles 52, 54 and around which passes a driving belt 66. Each driving pulley is integral with an off-centred pulley. Thus, if one of the driving pulleys is rotated by a motor, e.g. an electric motor, not shown in the drawing, the other driving pulley is simultaneously rotated at the same speed, the assembly driving the two pulleys 48, 50 in rotary manner about their off-centred spindle, which leads to the movement of the wire described hereinbefore.

According to an embodiment for a diameter of 300 mm of the off-centred pulleys, an off-centring of 50 mm, a pulley rotation speed of 3000 revolutions per minute (r.p.m.) (50 r.p.s.), an average, sampling transverse speed $V_b$ for the wire of $V_b$=10 m/s is obtained and the linear travel speeds of the wire will vary between 30 m/s ($V_{1min}$) and 60 m/s ($V_{1max}$).

Figure 8:
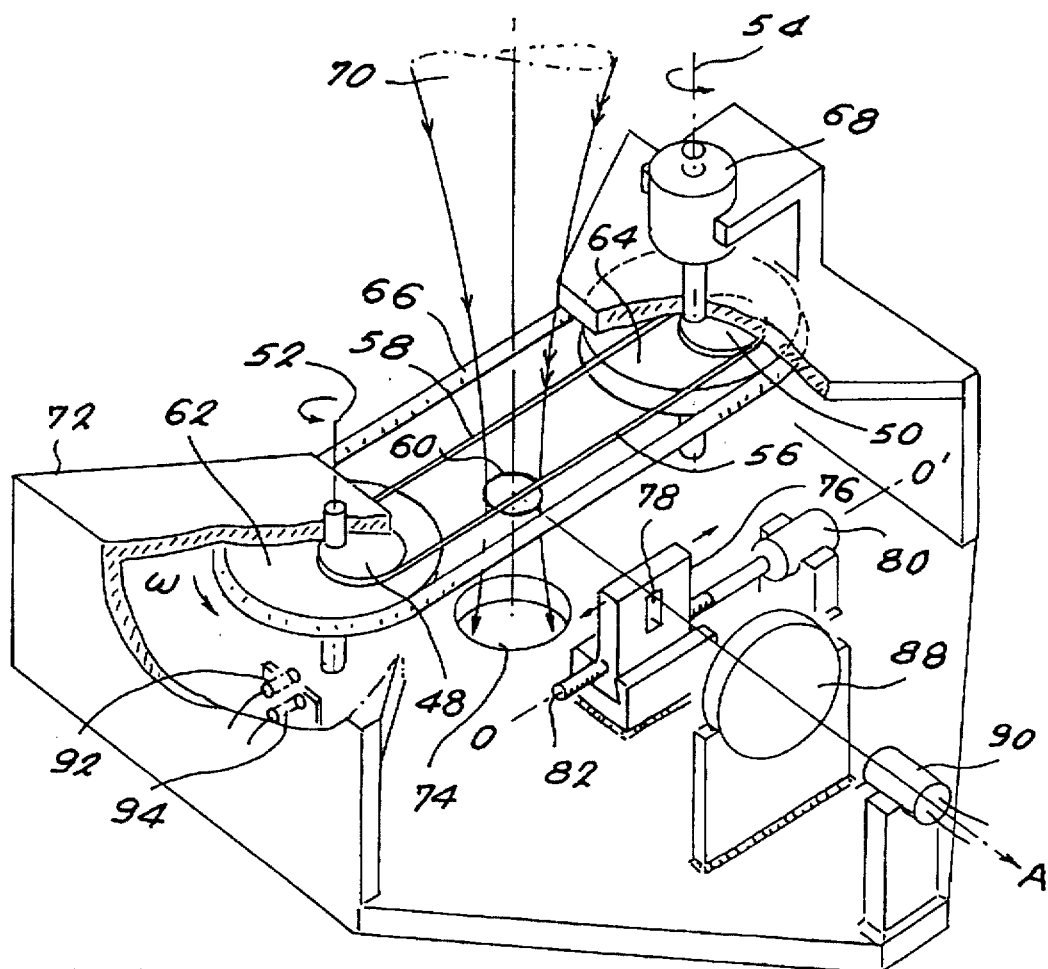
FIG. 8 An analyzer incorporating a laser beam sampling device and an analysis system.

FIG. 8 shows an analyzer incorporating a sampling device like that described hereinbefore and an analysis system of the beam reflected by the sampling device. FIG. 8 shows in perspective the sampling device with the off-centred pulleys 48, 50 and the driving pulleys 52, 64, their driving belt 66, the sampling wire 56, 58 and a motor 68 for driving the driving pulleys. The laser beam is designated in general terms by the reference 70 and the section thereof scanned by the wire is more specifically designated by the reference 60. The assembly is installed in a chassis 72, whose bottom is perforated by a hole 74, which allows the escape of the laser beam 70.

During the passage of the wire 56 in the beam focussing area, a small fraction of the laser power is reflected in the analysis direction A.

Figure 9:
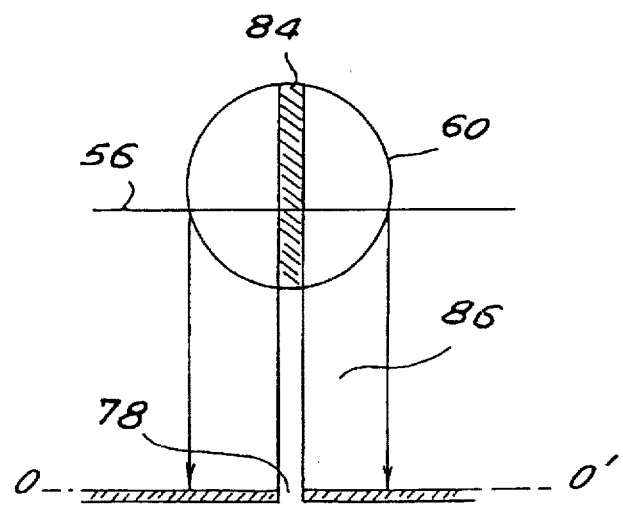
FIG. 9 In plan view a diaphragm for sampling a narrow band of the reflected beam.

An analyzer for analyzing the beam reflected in the direction A can comprise a diaphragm 76, in which is defined a slit 78 and means (e.g. an electric motor driving an endless screw 82) makes it possible to drive said diaphragm 76 in translation in a direction substantially perpendicular to the direction A according to which part of the beam is reflected. This direction is designated by the axis OO' in FIG. 8. As can be seen in greater detail in FIG. 9, where identical references to those of FIG. 8 designate identical parts, the diaphragm 76 and slit 78 being in plan view, the use of the slit makes it possible to analyze, for a given position, the power distribution in a narrow beam band 84. A part 86 of the light reflected by the wire in the direction of the diaphragm is stopped by the latter. On displacing the diaphragm with the aid of the stepping motor 80 along the axis OO', it is possible to successively select different bands in the section of the beam. With a single passage of the wire in said section, it is possible to adequately reflect the light to permit the analysis of a complete band. The analyzer can also incorporate a lens 88 for focussing the stopped down beam, as well as a detector 90 appropriate for the wavelength of the laser. The lens and the detector are shown fixed in FIG. 8. According to another embodiment, it would be possible to render integral said elements with the diaphragm 76, mobile in translation in accordance with OO'.

It is also possible to provide two detectors 92, 94 in the vicinity of one of the two rotation spindles of the driving pulleys, as illustrated in FIG. 8, one of the detectors 94 supplying an analysis start signal, e.g. for a given angular position of the pulleys 48, 50, corresponding to FIG. 7a, the other detector 92 supplying an analysis finish signal for a second angular position of the pulleys 48, 50, corresponding to FIG. 7c. Moreover, said second signal 92 triggers the displacement of the diaphragm 76 for the analysis of a new band 84 of the beam. Each of these detectors can e.g. be an optical reflection detector. The signal supplied by it can be delivered to a microprocessor, which controls the release or starting up of the motor 80, as well as acquisition, storage and processing means for the signals of the detector 90.

Figure 10:
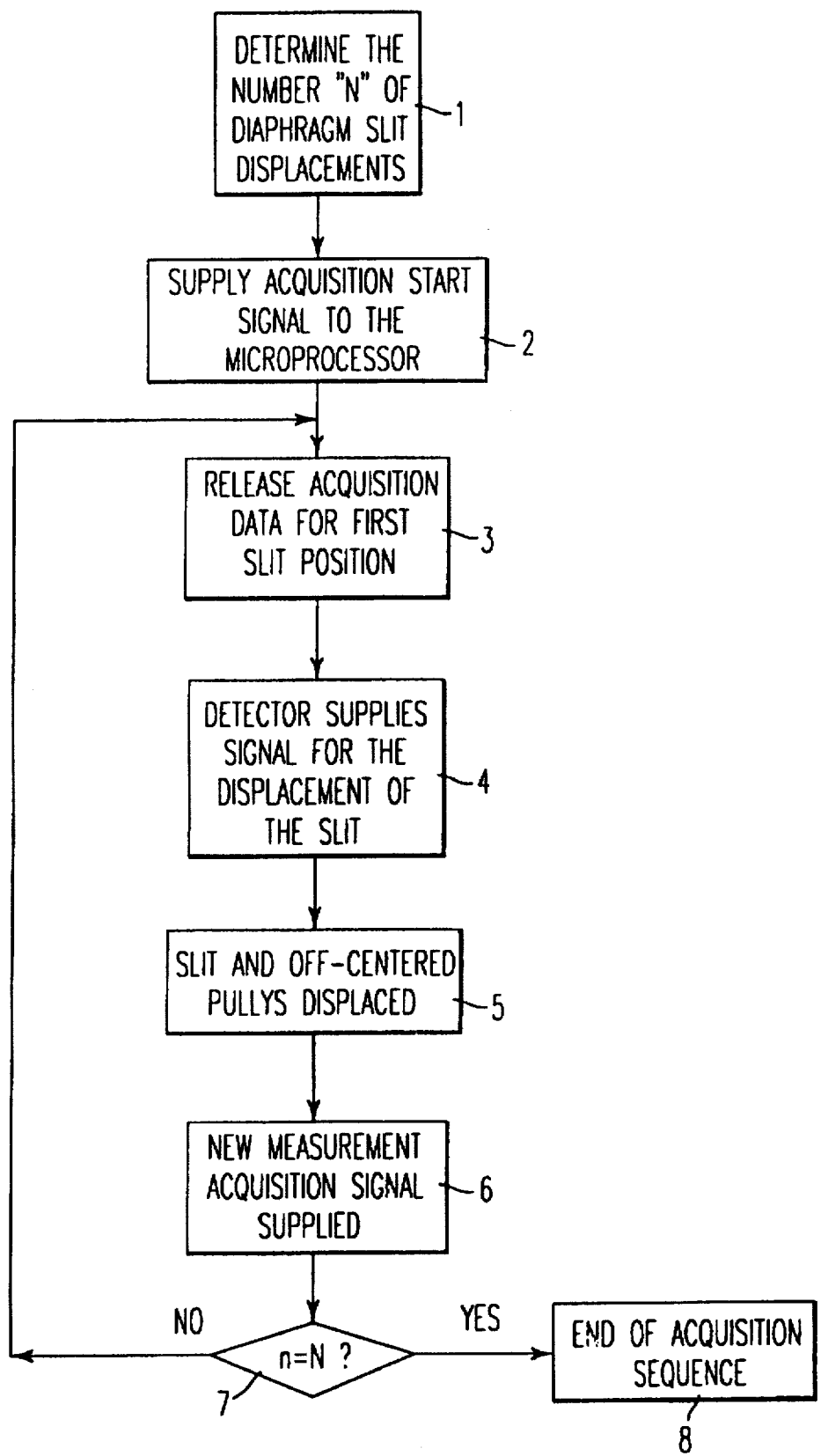
FIG. 10 A flowchart for the operation of an apparatus according to the invention.

FIG. 10 is a flowchart of an acquisition sequence for obtaining a distribution of the power of the laser beam, the evolution of an acquisition sequence and the control of the different components of the apparatus being ensured by the microprocessor.

In a first stage 1, the motor 68 is rotated at a predetermined speed and the number N of displacements of the diaphragm slit 76 which it is wished to perform is defined.

In a second stage 2, the detector 94 supplies an acquisition start signal to the microprocessor, which releases the detector 90 and the acquisition of the data corresponding to the first position of the slit 76 (stage 3).

When the off-centred pulleys have performed a half-turn, the detector 92 supplies (stage 4) a signal for the displacement of the slit 76 in accordance with axis OO'. This displacement (stage 5) takes place simultaneously with that of the off-centred pulleys, which perform a supplementary half-turn. At the end of this supplementary half-turn, the detector 94 supplies a new measurement acquisition signal (stage 6).

The number of turns of the pulleys 48, 50 corresponds to the number n of displacements performed. For each turn, a counter is incremented and the number of displacements n compared with the number N selected in stage 1 (stage 7).

When the number of displacements N fixed at the outset is reached, the complete analysis of the section of the beam has taken place and this represents the end of the acquisition sequence (stage 8). However, if said number N has not been reached, the acquisition is continued (stage 3).

When the acquisition is completed, the data collected by the detector 90 and which have been stored can be processed. From the latter deduction takes place by known methods of the energy density contained in the section 60 of the laser beam.

With this device, the operator chooses the analysis window as a function of the dimensions of the beam to be analyzed. Thus, he can analyze a highly focussed beam (e.g. diameter approximately 0.5 mm) by programming a small step for the displacement of the diaphragm slit. He can also analyze a wide beam (e.g. diameter a few dozen mm) by increasing the step of the displacement of the diaphragm slit. Finally, the mechanical decoupling between the sampling device and the analyzer makes it possible to optimize and reduce the analysis time.

We claim:

1. A device for sampling a cross-section portion of a laser beam, said device comprising:

an elongated reflective wire; and a supporting and driving structure operative to cause the movement of the elongated reflective wire with a complex motion having a translation component of motion in a main direction that corresponds to the direction of elongation of the supported elongated reflective wire and a translation component of motion in a first direction perpendicular to the main direction, wherein the supporting and driving structure further comprises:

a pair of driving pulleys with grooves to engage and drive said elongated reflective wire, a driving spindle mounting each of the driving pulleys in an off-center manner, and a drive device for causing rotation of the driving pulleys so that they rotate eccentrically about each individual driving spindle to provide the elongated reflective wire with both the main direction component of motion and the first direction component of motion.

2. A sampling device as claimed in claim 1, wherein the drive device further comprises:

a motor;

a drive coupling mechanism with a pair of further pulleys, each of the further pulleys being mounted to one of the drive spindles at a central point of each of said further pulleys; and a band linking both said further pulleys together for dual rotations.

3. An apparatus for analyzing a laser beam incorporating a device for sampling a cross-section portion of the laser beam, said device comprising:

an elongated reflective element;

a supporting and driving structure operative to cause the movement of the elongated reflective element with a complex motion having a component of motion in a main direction that corresponds to the direction of elongation of the supported elongated reflective element and a component of motion in a first direction perpendicular to the main direction; and a system for analyzing a beam reflected by said elongated reflective element, wherein said reflected beam analyzing system further comprises:

a slit diaphragm, and means for the displacement of the slit diaphragm in a translatory movement in a direction essentially perpendicular to a second direction along which the elongated reflective element reflects light.

4. An apparatus according to claim 3, wherein the means for displacing the slit diaphragm comprises a stepping motor.

5. An apparatus according to claim 3, also comprising a lens for focusing a beam part passed by the slit diaphragm.

6. An apparatus according to any one of claims 3 to 5, further comprising a system for detecting a reflected beam which is tuned to the wavelength of the laser beam.

7. An apparatus according to claim 6, wherein the lens and detection system are attached to the slit diaphragm and translate with the slit diaphragm.

8. An apparatus for analyzing a laser beam, comprising:

a laser beam segment analyzing detector receiving a segment of the laser beam and converting it to a signal for analyzing;

a laser beam analyzer to perform said analyzing; and a sampling device providing a sampled small segment of the laser beam to said analyzing detector, said sampling device comprising:

an elongated reflective element; and a supporting and driving structure operative to cause the movement of the elongated reflective element with a complex motion having a component of motion in a main direction that corresponds to the direction of elongation of the supported elongated reflective element and with a component of motion in a first direction perpendicular to the main direction.

9. An analyzing apparatus as claimed in claim 8, wherein said elongated reflective element is a wire.

10. An analyzing apparatus as claimed in claim 9, wherein the supporting and driving structure further comprises:

a pair of driving pulleys with grooves to engage and drive said wire;

a driving spindle mounting each of the driving pulleys in an off-center manner; and a drive device for causing rotation of the driving pulleys so that they rotate eccentrically about each of the driving spindles to provide the wire with both the main direction component of motion and the first direction component of motion.

11. An analyzing apparatus as claimed in claim 10, wherein the drive device further comprises:

a motor;

a drive coupling mechanism with a pair of further pulleys, each of the further pulleys being mounted to one of the drive spindles at a central point of each of said further pulleys; and a band linking said further pulleys together for dual rotations.

12. An analyzing apparatus as claimed in any one of claims 8, 9, 10, or 11, further comprising:

a slit diaphragm;

a drive arrangement connected to said slit diaphragm to cause said slit diaphragm to move along an axis perpendicular to a direction along which the elongated reflective element reflects light and in a position to receive a reflected laser beam portion from said elongated reflective element; and wherein said slit diaphragm stops a portion of said reflective laser beam portion while passing a narrow band shaped segment to the laser beam segment analyzing detector as the segment of the laser beam to be analyzed.

13. An analyzing apparatus as claimed in claim 12, wherein said drive arrangement includes a stepping motor.

14. An analyzing apparatus as claimed in claim 13, further comprising a lens placed between the analyzing detector and the slit diaphragm so as to focus the narrow band shaped segment passed by the slit diaphragm onto the analyzing detector.

15. An analyzing apparatus as claimed in claim 14, wherein said drive arrangement is further connected to said lens and said analyzing detector to move said lens and said analyzing detector integrally with said slit diaphragm.

16. An analyzing apparatus as claimed in claim 12, wherein the analyzing detector has a response characteristic tuned to the laser beam wavelength to be analyzed.

* * * * *